United States Patent
Baverel et al.

(10) Patent No.: US 7,891,383 B2
(45) Date of Patent: Feb. 22, 2011

(54) RINGED TUBULAR SHEATH AND DEVICE FOR MAKING SUCH A SHEATH

(75) Inventors: Christophe Baverel, Trevenans (FR); Benoit Remy, Sancey le Grand (FR)

(73) Assignee: Delfingen FR-Anteuil S.A., Anteuil (FR)

( * ) Notice: Subject to any disclaimer, the term of this patent is extended or adjusted under 35 U.S.C. 154(b) by 55 days.

(21) Appl. No.: 12/348,069

(22) Filed: Jan. 2, 2009

(65) Prior Publication Data

US 2009/0140105 A1 Jun. 4, 2009

Related U.S. Application Data

(63) Continuation of application No. PCT/EP2007/005937, filed on Jul. 5, 2007.

(30) Foreign Application Priority Data

Jul. 5, 2006 (FR) .................................. 06 06089

(51) Int. Cl.
*F16L 11/00* (2006.01)

(52) U.S. Cl. .................. 138/121; 138/115; 138/122; 138/128; 138/156; 138/151

(58) Field of Classification Search ............ 138/121, 138/122, 128, 151, 156, DIG. 8
See application file for complete search history.

(56) References Cited

U.S. PATENT DOCUMENTS

| 4,194,081 | A | * | 3/1980 | Medford et al. | ............... 174/47 |
| 4,296,157 | A | * | 10/1981 | Conti | ........................ 138/121 |
| 6,096,975 | A | * | 8/2000 | Streit | ........................ 174/68.3 |
| 6,488,053 | B1 | * | 12/2002 | Tadokoro | .................... 138/156 |
| 6,843,276 | B2 | * | 1/2005 | Tadokoro | .................... 138/121 |
| 6,938,645 | B2 | * | 9/2005 | Duarte et al. | ............... 138/156 |

FOREIGN PATENT DOCUMENTS

| EP | 0268869 | 6/1988 |
| EP | 0860921 | 8/1998 |
| FR | 2745429 | 8/1997 |
| JP | 2000115942 | 4/2000 |

\* cited by examiner

*Primary Examiner*—Patrick F Brinson
(74) *Attorney, Agent, or Firm*—Sturm & Fix LLP

(57) ABSTRACT

Ringed tubular sheath comprising two open shells (33, 37), termed the outer (33) and inner (37) shells, both of the same diameter (D), one of which, the outer shell (33), has an opening (E1) smaller than the diameter (D) so as to engage by elastic deformation over the inner shell (37) in a closed position. In the course of this engagement, the opening (E1) of the outer shell (33) becomes stretched until it passes a point corresponding to the diameter (D) of the inner shell (37) and, beyond this point, returns to the unstretched position. In the invention, the two shells (33, 37) are connected to a hinge (17) so as to engage by pivoting about the hinge (17), the opening (E1) of the outer shell (33), which is smaller than the diameter (D), extending from the hinge (17) to an opposite edge (34) of the shell.

4 Claims, 7 Drawing Sheets


RINGED TUBULAR SHEATH AND DEVICE FOR MAKING SUCH A SHEATH

CROSS REFERENCE TO RELATED APPLICATIONS

This application is a Continuation application of PCT/EP2007/005937 filed Jul. 5, 2007, claiming priority of FR 0606089 filed Jul. 5, 2006, which are incorporated by reference herein in their entirety.

BACKGROUND OF THE INVENTION

1. Field of the Invention

The present invention relates to a ringed tubular protective sheath, more specifically comprising two open shells, referred to as the outer and inner shells, which have the same diameter and one of which, the outer shell, has an opening smaller than the diameter so as to engage by elastic deformation over the inner shell in a closed position.

2. Description of the Related Art

It should be recalled that the bundle of electric cables provided in a car is conventionally formed by electric wires with a round cross-section which are assembled in wire strands. Once these strands have been formed, the bundle is provided with various protective elements before being fixed onto different elements of the vehicle, such as the engine and the car body.

Ringed tubular sheaths are one of the types of protection for bundles of electric wires commonly used in the car industry. The ringed tubular sheaths, formed by moulding an extruded tube into a succession of rings, are conventionally produced from extruded plastics materials, such as polypropylene, polyamide or polyesters. These sheaths provide effective resistance to abrasion and crushing, while maintaining a high level of flexibility which facilitates the production and packaging of the protected cabling, and the installation thereof in the vehicle. However, it is difficult to thread the strand in the ringed sheath, in particular over long portions of said sheath. This is why split ringed sheaths are often used, i.e. ones which are cut along a straight longitudinal line at the end of the production process. This enables electric wires and cables to be subsequently introduced directly through the split into any region of the sheath.

The split ringed sheaths may comprise more or less complex closing systems so as to prevent wires from escaping from the tube in regions where the split tends to reopen. These closing systems have been found to be relatively ineffective in regions with low radii of curvature, or cause the sheath to become too rigid. An example of this type of sheath is provided by document EP-A-860 921.

The split ringed sheaths can also be taped up completely once they have been positioned over the bundle of cables, and this locks the split effectively, but requires an additional operation from the person installing the cables.

Another solution, which is known for example from EP-A-268869, involves using an assembly consisting of a first open shell which is positioned around the bundle of electric cables and a second open shell with the same diameter as that of the first shell, excluding the thickness of the wall. The second shell, also referred to as the outer shell, has an opening which is smaller than the diameter so as to engage by elastic deformation over the first shell, also referred to as the inner shell. During engagement, the outer shell opening undergoes tensile deformation until it passes the point corresponding to the diameter of the inner shell. After this point, the outer shell opening returns to its unstretched position. In document JP 2000-115942, the two shells are connected by a longitudinal strip to remedy the drawback of an assembly consisting of two separate elements which complicates the logistics, the cut along the protective element and the installation operations for the person laying the cables.

The solution disclosed by these two documents allows the ringed tubular sheath to be held in the closed position by the opening of the outer shell merely returning to the unstretched position. In other words, no other locking means is required to hold the two shells in the closed position. However, this solution requires a relatively high level of force to engage the outer shell on the inner shell, since the inner shell does not facilitate the insertion process and in contrast tends to oppose the deformation of the outer shell opening until it has passed the point corresponding to the diameter.

SUMMARY OF THE INVENTION

An object of the invention is to modify a known ringed tubular protective sheath according to the above summary to reduce the force required to engage the two shells in the closed position and thus to simplify the use of the sheath.

For this purpose, the invention relates to a ringed tubular sheath comprising two open shells, referred to as the outer shell and inner shell, which have the same diameter and one of which, the outer shell, has an opening which is smaller than the diameter so as to engage by elastic deformation over the inner shell in a closed position, characterised in that the two shells are connected to a hinge so as to engage by pivoting about the hinge, the opening of the outer shell, which is smaller than the diameter, extending from the hinge to an opposite edge of the shell.

The inner shell preferably has an opening which extends from the hinge to an opposite edge of the shell and is smaller than the opening of the outer shell, and the two shells overlap in the closed position by an overlap angle of between 145° and 155°, defined by the two opposite edges of the shell.

The ringed protective sheath thus obtained prevents the cables from escaping from the sheath, in particular when the bundle of cables extends in regions with a small radius of curvature, even when the sheath is 100% full. This protective sheath is an advantageous replacement for the existing solutions, guaranteeing that the cables are protected in regions with a small radius of curvature while simplifying the management of part numbers, the longitudinal cut and the installation operations for the person fitting the cables.

The invention further relates to a device for producing a ringed tubular sheath according to the invention, comprising an extruder provided with an extrusion nozzle for extruding a tube, a moulder equipped with moulds which are each provided with a ringed profile and are arranged in pairs along the same mating plane to mould the tube into a ringed-wall tube, characterised in that the extrusion nozzle and the ringed profile of two paired moulds have an inward curve in a median plane so as to extrude the tube as two tubular parts which have the same diameter and are connected to one another in the inward curve median plane, and to simultaneously mould the rings on the two tubular parts respectively, the ringed profile of one of the two paired moulds having a non-ringed part in the inward curve median plane to produce a longitudinal strip of wall without rings, a cutting means for cutting a longitudinal strip of material being arranged on either side of the inward curve median plane and opposite the non-ringed longitudinal strip to form two shells with the same diameter which are connected to one another by the non-ringed longitudinal strip, which forms a hinge, and are each provided with an opening which extends from the hinge to an opposite edge of the shell resulting from the process of cutting the longitudinal strip of material.

The extrusion nozzle and ringed profile of the two paired moulds preferably have a cross-section which is inscribed in two circles, the centres of which are arranged close to one another so as to overlap in a median plane, and the cutting means is arranged in an unsymmetrical manner relative to the inward curve median plane.

BRIEF DESCRIPTION OF THE DRAWINGS

A clearer understanding of the invention will be facilitated by the appended drawings, which are given by way of non-limiting examples and in which.

DETAILED DESCRIPTION OF THE PREFERRED EMBODIMENT

According to one embodiment of the invention, referring to FIGS. 1, 2 and 6, the ringed sheath 9 is obtained by extrusion moulding a tube made of thermoplastic material with an inwardly curved oblong shape and subsequently cutting a longitudinal strip from this tube.

Figure 1:
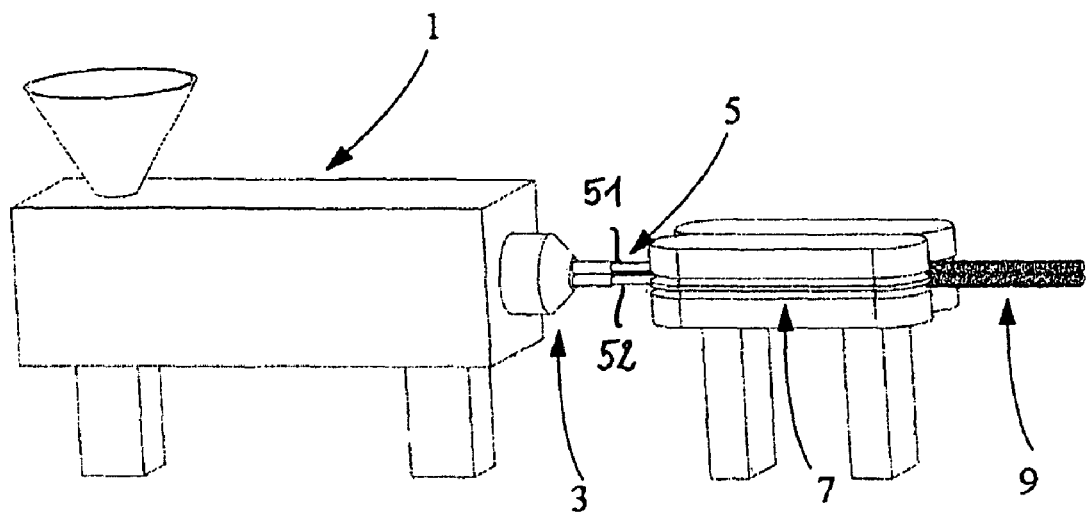
FIG. 1 shows the process of extrusion moulding the ringed sheath.
Figure 2:
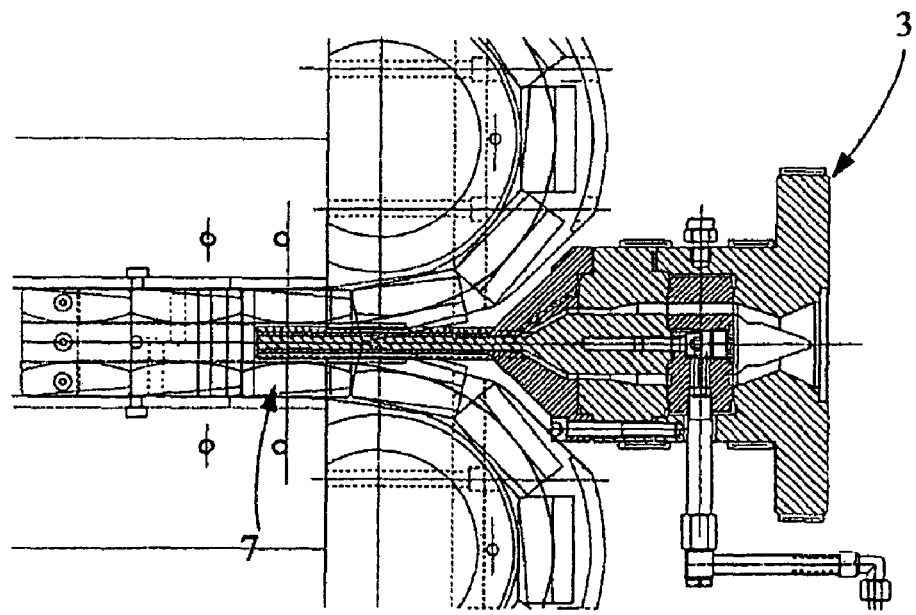
FIG. 2 shows a section of the extrusion nozzle and the moulds.
Figure 3:
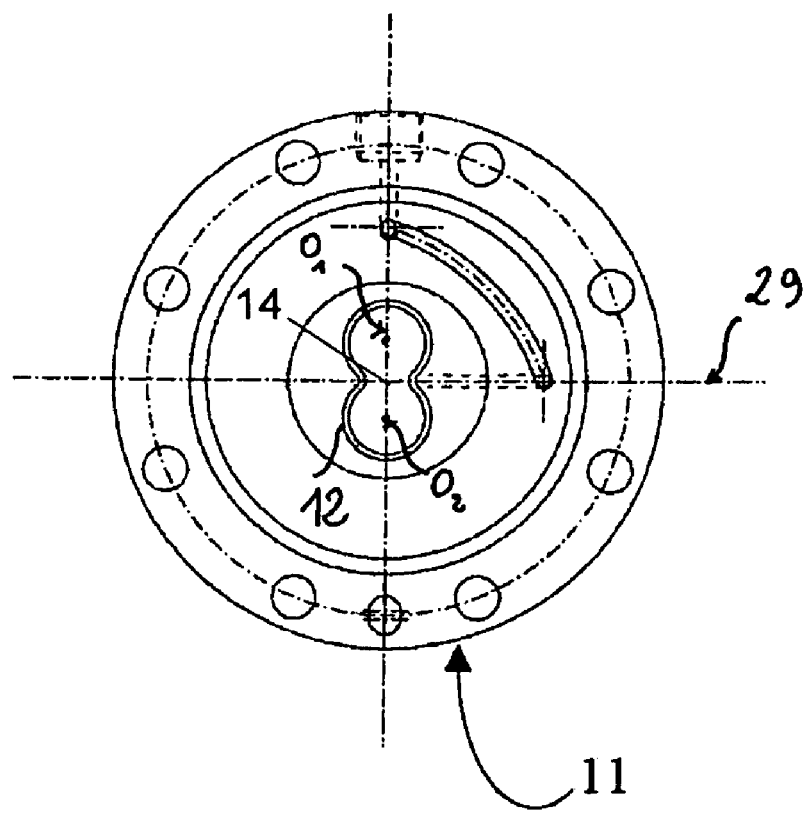
FIG. 3 is a front view of the inwardly-curved-oblong die.

Referring to FIGS. 1, 2 and 3, the thermoplastic material, a polypropylene for example, is heated in an extruder 1 with a minimum extrusion temperature of approximately 190° C., and then passes through an extrusion head 3. An extrusion nozzle 12 fitted in a die 11 gives the material the shape of an oblong tube 5 which is curved inwards along a median plane 29. In order to obtain this effect, the extrusion nozzle 12 has an inward curve 14 in its median plane 29 so as to extrude the inwardly curved oblong tube 5 as a first tubular part 51 and a second tubular part 52 which have the same diameter D and are connected to one another in the inward curve median plane 29. In a moulder 7, this tube 5 is blown and cooled against the walls of two paired moulds 47, 49 which are in the form of half-shells 13 with a ringed profile 48, extend in the direction of extrusion and face one another along a mating plane 13 along the length L of the tube 5 so as to provide said tube with a ringed wall. The ringed profile 48 of two paired half-shells 47, 49 also has an inward curve 14 in the median plane 29 of said half-shells to mould the rings 43, 45 in both tubular parts 51, 52 simultaneously.

In the examples shown, the extrusion nozzle 12 and the ringed profile 48 of the two paired moulds 47, 49 have a cross-section which is inscribed in two circles, the centres O1, O2 of which are located close to one another in such a way that there is an overlap in their median plane 29.

Figure 4:
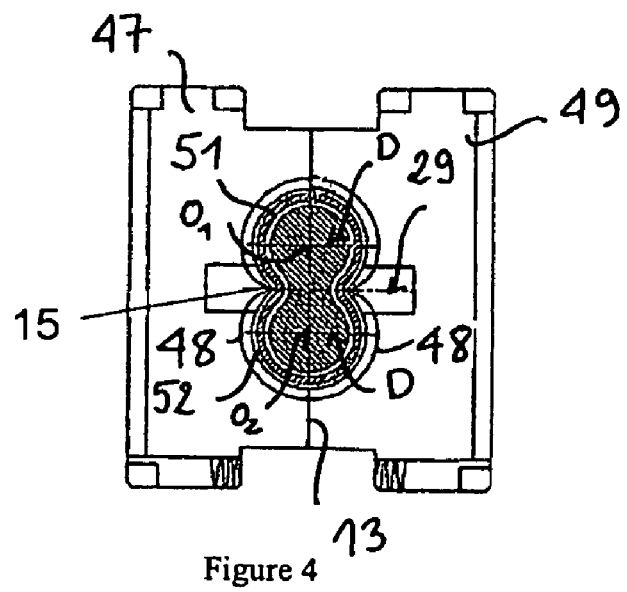
FIG. 4 is a front view of a pair of moulds.
Figure 5:
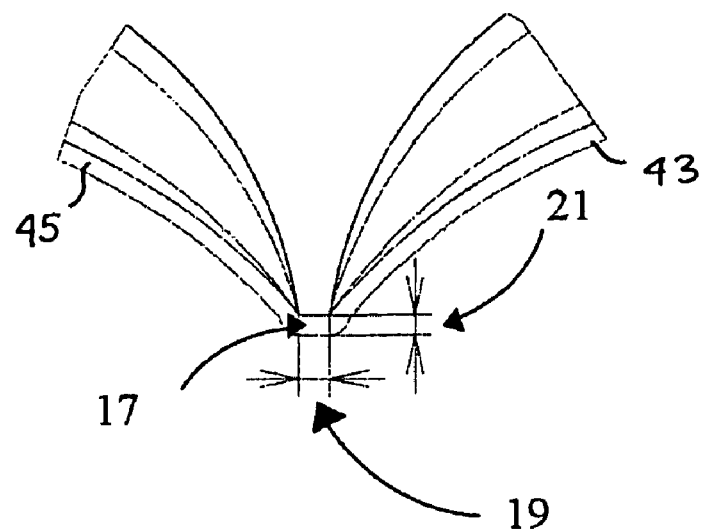
FIG. 5 is an enlarged view of the hinge region thus obtained on the ringed sheath.

Referring to FIGS. 4 and 5, the profile 48 of one 49 of the half-shells of each pair of half-shells 13 which moulds the tube 5 has a flat region 15 in the inward curve median plane 29. Due to this flat region 15, it is possible to mould a tube 5 comprising a non-ringed longitudinal strip 17, the thickness 21 and width 19 of which enable it to remain sufficiently flexible so as to act as a hinge by means of plastic deformation, while still ensuring that the sheath 9 does not become excessively stiff. By way of example, in a ringed tube with a diameter of 23 mm, the thickness 21 is 0.4 mm, and the width 19 is 0.45 mm.

Figure 6:
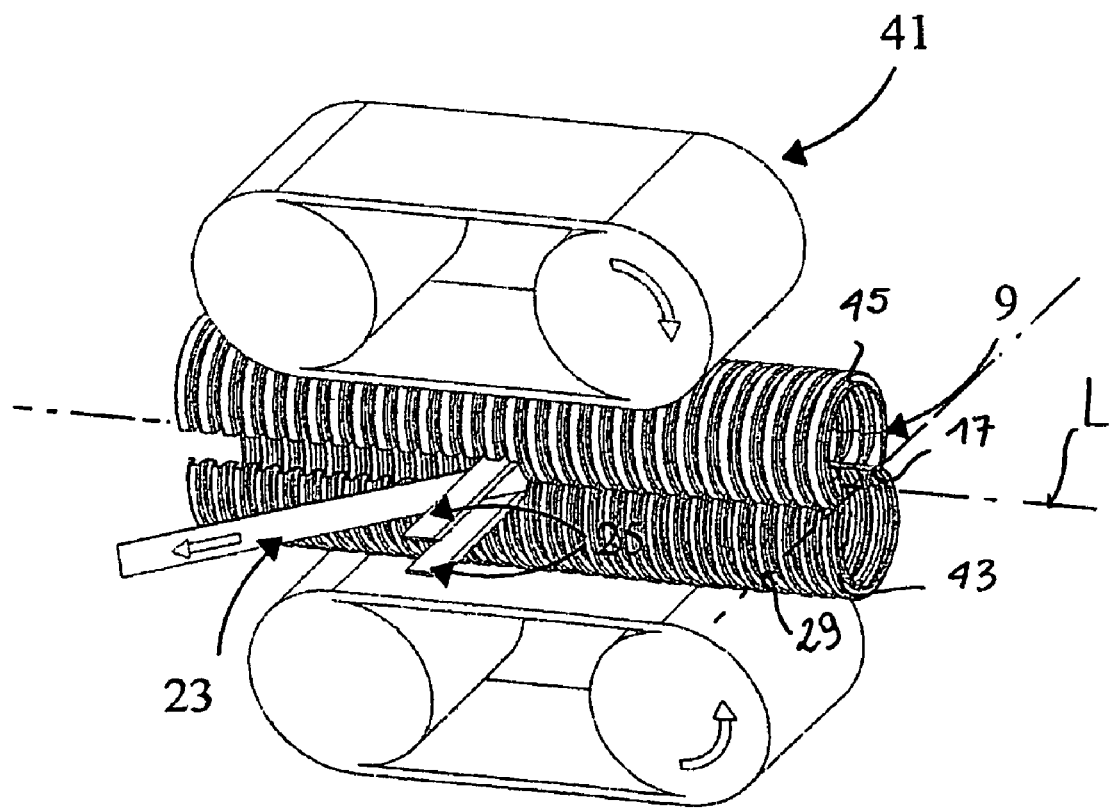
FIG. 6 shows the process of cutting the ringed sheath.

Referring to FIG. 6, the ringed sheath 9 is conveyed by a take-off system 41 towards two cutter blades 25 so as to cut and remove a longitudinal strip 23 of material opposite the longitudinal flat strip 17 which forms the hinge. The cutter blades 25 may be replaced by a rotary blade system.

Figure 7:
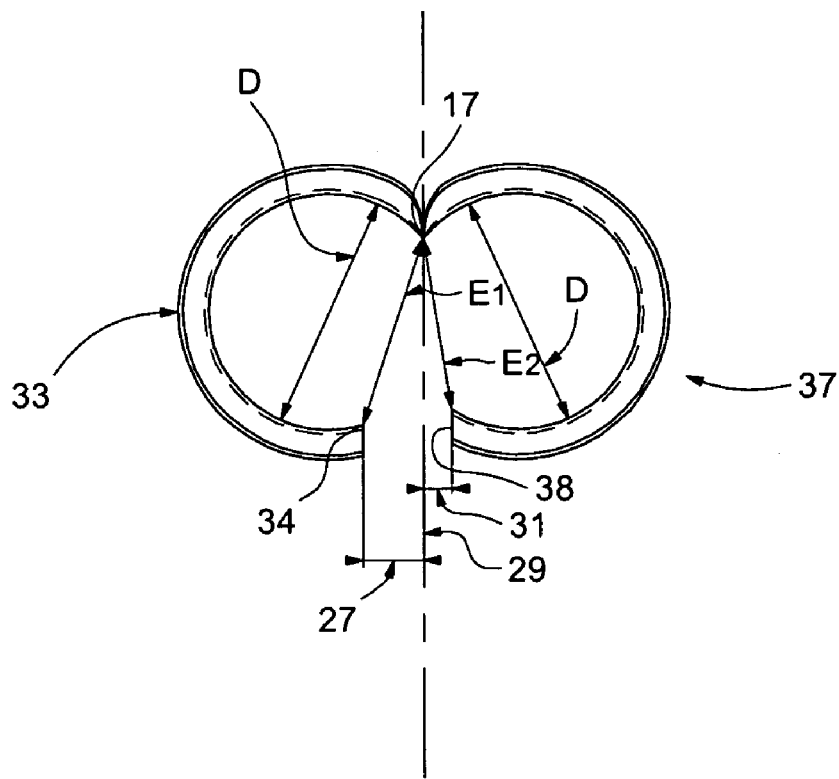
FIG. 7 is a front view of the ringed sheath cut in this way.

Referring to FIG. 7, the strip of material is removed from the wall opposite the flat region 17 to form two open shells 33, 37 resulting from the first 51 and second 52 tubular parts of the inwardly curved oblong tube 5. The two shells, referred to as the outer shell 33 and the inner shell 37, therefore have the same diameter D and are connected by a non-ringed longitudinal strip 17 which forms the hinge. The outer shell 33 has an opening E1 which is smaller than the diameter D so as to engage on the inner shell 37 by pivoting about the hinge 17. The opening E1 of the outer shell 33 extends from the hinge 17 to the opposite edge of the shell 34 which is formed by cutting away the strip 23 of material. Pivoting the two shells 33, 37 about the hinge 17 enables the outer shell to slide over the inner shell and the inner shell to slide under the outer shell simultaneously. The elastic deformation of the opening E1 of the outer shell 33 until it reaches the point corresponding to the diameter D of the inner shell 37 is thus reduced. Closing the sheath by engagement is thus easier.

Cutting is preferably carried out off-centre relative to the inward curve median plane 29, that is to say that the cutting means 25 is arranged unsymmetrically about the inward curve median plane 29 so as to form an opening E2 in the inner shell 37 which is smaller than the opening E1 formed in the outer shell 33. Like the opening E1 of the outer shell 33, the opening E2 of the inner shell 37 extends from the hinge 17 to an opposite edge 38 of the shell formed by cutting away the strip 23 of material. This arrangement further simplifies the pivoting of the two shells 33, 37 in relation to one another about the hinge 17 into the closed position. By way of example, for a ringed sheath with a diameter D of 23 mm, the distance 27 between the inward curve median plane 29 and the edge 34 of the outer shell 33 is 9 mm and the distance 31 between the inward curve median plane 29 and the edge 38 of the inner shell is 2.5 mm. The distance 27 is to be sufficient to allow the bundle 35 of cables to be protected to be inserted easily, but not too great to ensure that the protective sheath retains its closed position when the outer part covers the inner part.

Figure 8:
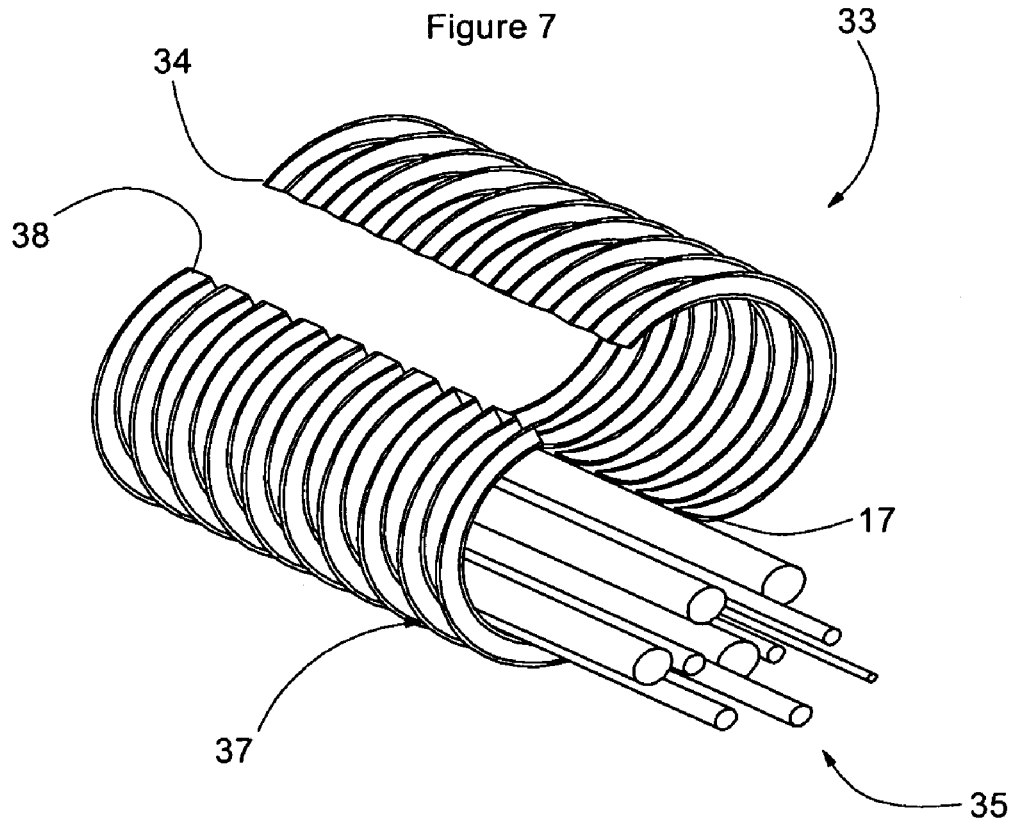
FIG. 8 shows the cut ringed sheath as it is fitted over the bundle of wires.

Referring to FIG. 8, the sheath thus obtained, which is composed of an inner shell 37 and an outer shell 33, is positioned by the operator over the bundle of cables to be protected.

Figure 9:
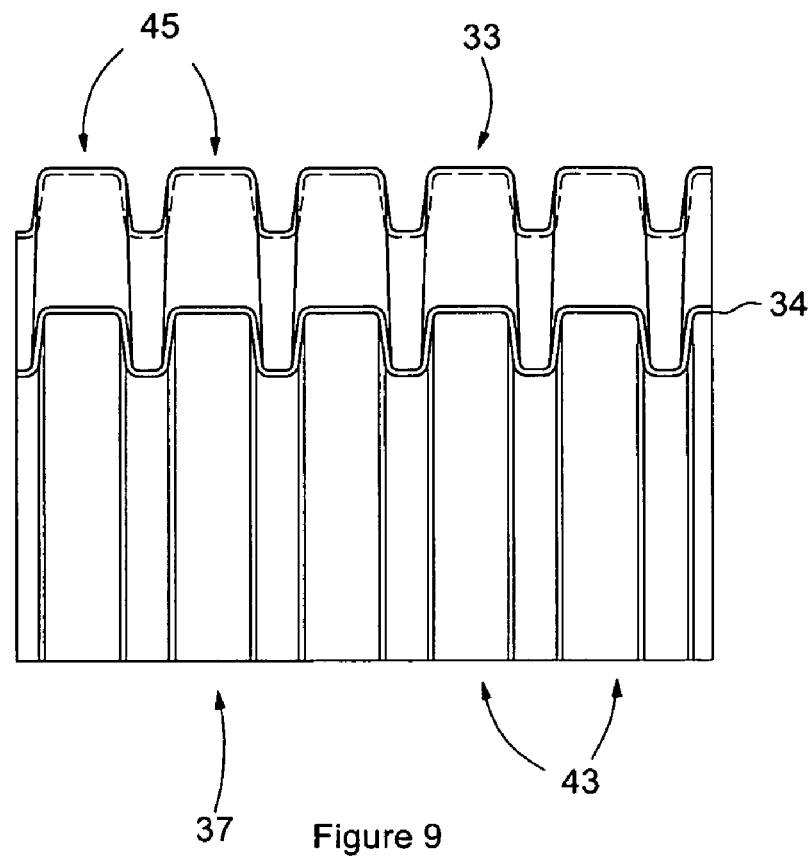
FIG. 9 shows the outer sheath as it is positioned on the inner sheath.
Figure 10:
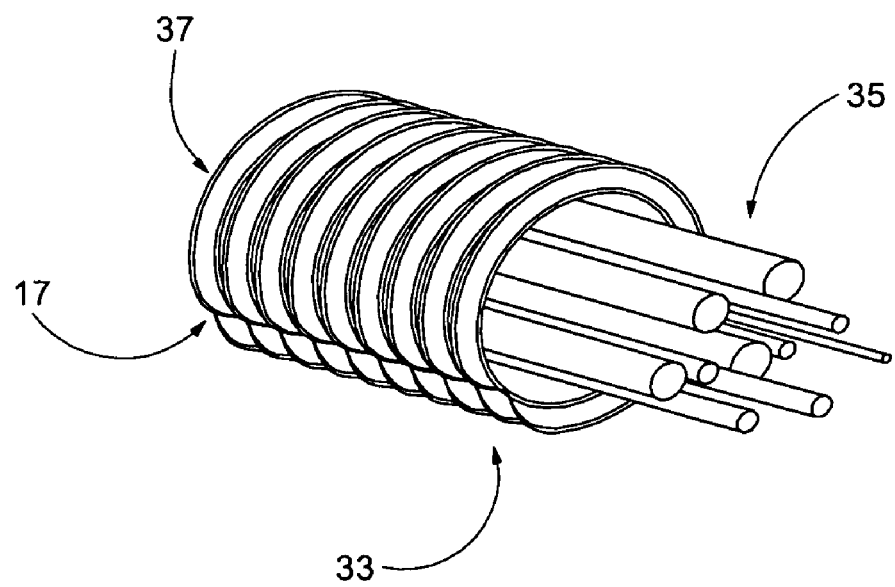
FIG. 10 shows the sheath thus obtained when closed around the bundle of cables.

Referring to FIGS. 9 and 10, the outer shell 33 pivots about the hinge 17 so as to engage over the inner shell 37 by elastic deformation by stretching the opening E1 of the outer shell 33, and by elastic deformation by compressing the opening E2 of the inner shell 37. In the closed position, the rings 45 of the outer shell 33 are engaged in the rings 43 of the inner shell 37.

Figure 11:
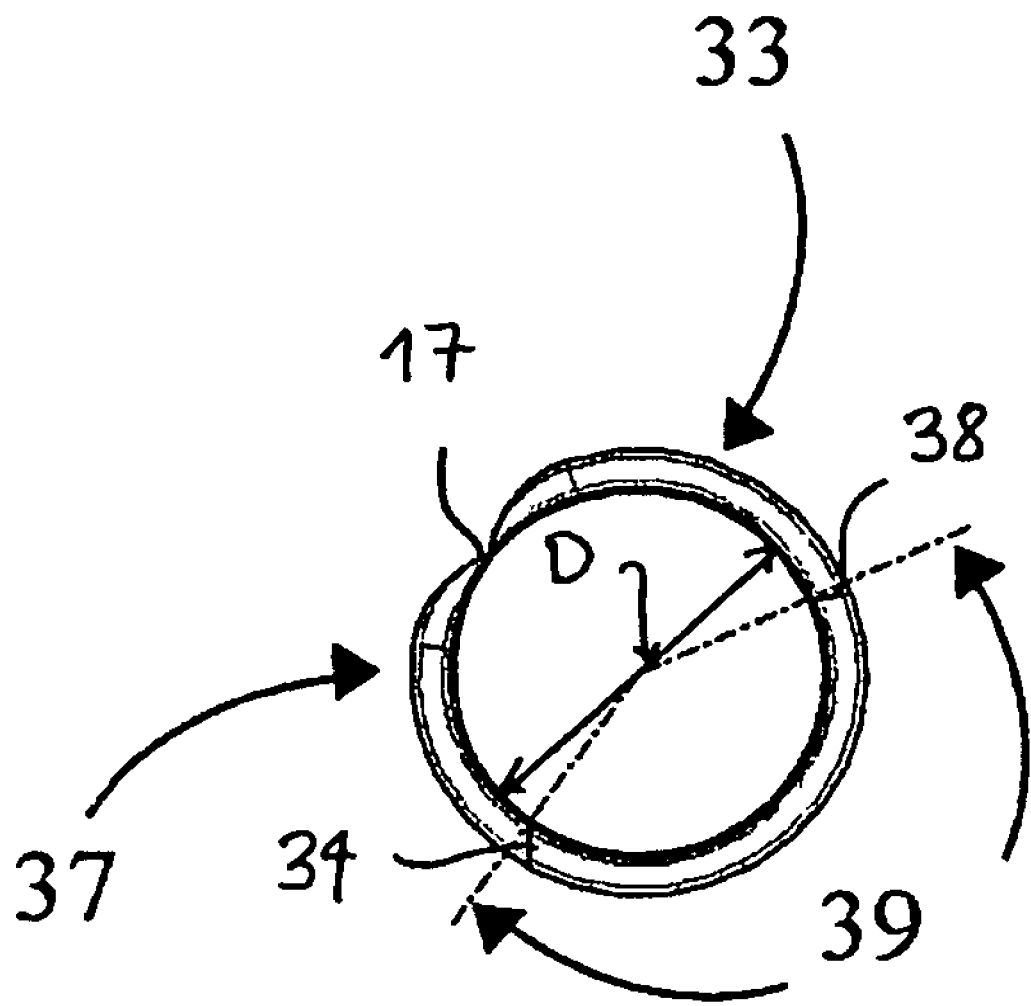
FIG. 11 is a section of the sheath thus obtained.

Referring to FIG. 11, the outer shell 33 overlaps the inner shell 37 over an angle 39. The overlap angle 39 is defined by the edges 34, 38, opposite the hinge 17, of the two shells. By way of example, the overlap angle is between 145° and 155°, preferably 150°.

Figure 12:
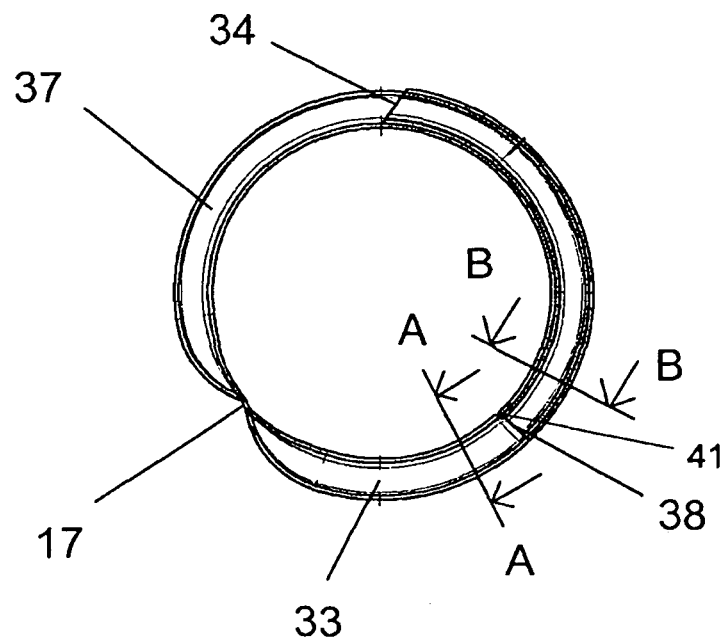
FIG. 12 is a cross-section of a sheath according to the invention in which the ring height in the region in which the outer and inner shells overlap is the same as the ring height outside this region.
Figures 13A, 13B:
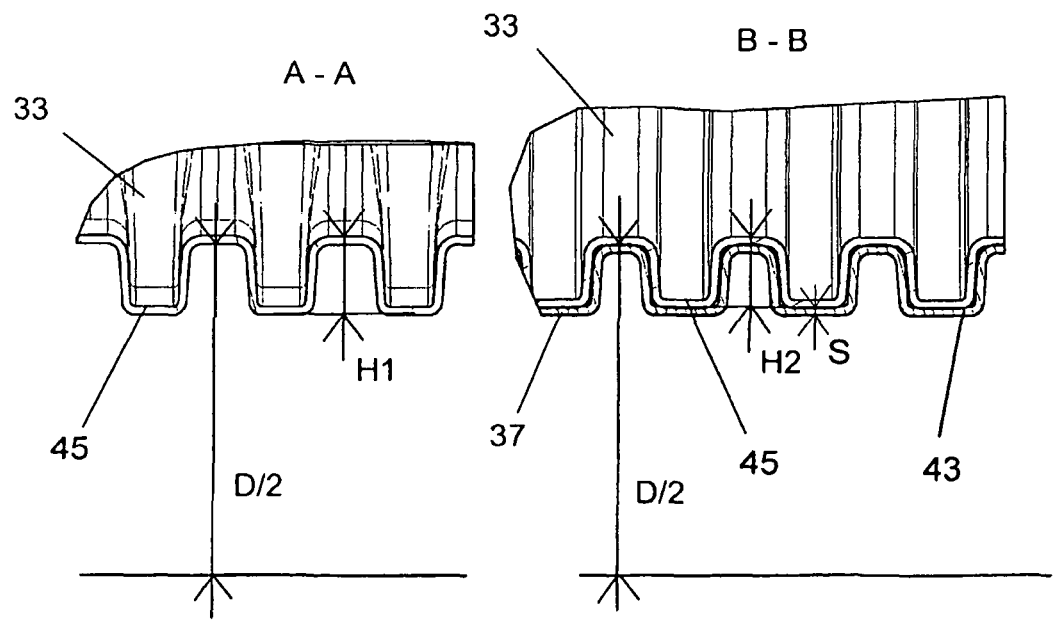
FIGS. 13a and 13b are sections along the lines A-A and B-B in FIG. 12 inside and outside respectively of the region in which the outer and inner shells overlap.

Referring to FIGS. 12 and 13, the outer shell 33 has two different ring heights H1 and H2, which are measured peak to peak from the same diameter D, to form a setback 41 which is equal to the thickness S of the inner shell 37. The outer shell 33 has the ring height H1 along the arc which extends between the hinge 17 and the setback 41. Along the arc which extends between the setback 41 and the edge 34 opposite the hinge 17 and which corresponds to the overlap angle 39 of the two shells 33, 37 in the closed position, the ring height is H2, which is smaller than H1.

Along the arc over which there is an overlap, the ring height H2 of the outer shell 33 which is extended by the thickness of the wall S of the inner shell 37, is equal to the ring height H1 of the outer shell 33 along the arc over which there is no overlap. This arrangement enables the edge 38, opposite the hinge 17, of the inner shell 37 to abut the setback 41 without projecting into the interior of the sheath to avoid forming an edge which could have an abrasive or cutting effect on the bundle 35 of cables received in the sheath.

In order to produce the different ring heights H1 and H2, the two paired moulds 47, 49 have a ringed profile 48 with two ring heights, measured from the same diameter, corresponding to the diameter D of the two tubular parts 51, 52 of the moulded tube 5, in order to obtain a difference in height which is selected so as to correspond to the thickness S of the ringed wall 43 of one 51 of the two tubular parts 51 and 52 which form the inner shell 37.

The invention claimed is:

1. Ringed tubular sheath comprising two open shells comprising an outer shell and inner shell, which have the same diameter, wherein the outer shell has an opening which is smaller than the diameter so as to engage by elastic deformation over the inner shell in a closed position, and during the course of this engagement the opening of the outer shell is subjected to tensile deformation until it has passed a point corresponding to the diameter of the inner shell and, beyond this point, returns to the unstretched position, wherein the two shells are connected by means of a hinge formed of the same material of each shell so as to engage by pivoting about the hinge, the opening of the outer shell which is smaller than the diameter, extending from the hinge to an opposite edge of the shell, wherein said hinge is a longitudinal flat strip.

2. Ringed tubular sheath according to claim 1, wherein the inner shell has an opening which extends from the hinge to an opposite edge of the shell and is smaller than the opening of the outer shell.

3. Ringed tubular sheath according to claim 2, wherein the two shells overlap in the closed position by an overlap angle of between 145° and 155°, defined by the two opposite edges of the shell.

4. Ringed tubular sheath according to claim 3, wherein the outer shell has two ring heights, which are measured from the diameter and which have a difference in height which is equal to the thickness of the ringed wall of the inner shell so as to form a setback against which the edge, opposite the hinge of the inner shell abuts.

\* \* \* \* \*